INFLATABLE ELECTROMAGNETICALLY SHIELDED ENCLOSURE

Filed July 20, 1966 2 Sheets-Sheet 1

HOWARD L. HAYDEN
JOSEPH P. TOBIN
INVENTORS.

BY Dominick Nardelli

ATTORNEY

INFLATABLE ELECTROMAGNETICALLY SHIELDED ENCLOSURE

Filed July 20, 1966 2 Sheets-Sheet 2

HOWARD L. HAYDEN
JOSEPH P. TOBIN
INVENTORS.

BY Dominick Nardelli

ATTORNEY

United States Patent Office 3,390,491

Patented July 2, 1968

3,390,491

INFLATABLE ELECTROMAGNETICALLY SHIELDED ENCLOSURE

Howard L. Hayden, Palos Verdes, and Joseph P. Tobin, Miraleste, Calif., assignors to The Garrett Corporation, Los Angeles, Calif., a corporation of California Filed July 20, 1966, Ser. No. 566,675
13 Claims. (Cl. 52—2)

ABSTRACT OF THE DISCLOSURE

A portable, electromagnetic-shielded, inflatable structure having an air impervious, electrical conducting structure with means for shorting electrical currents flowing within the structure.

This invention relates generally to portable structures and, more particularly to an inflatable structure capable of substantially preventing electromagnetic waves from passing through the walls thereof.

One problem associated with electronic equipment, which generates electromagnetic waves, hereinafter called radio waves, is that the generated radio waves need to be contained because stray radio waves interfere with the proper operation of other electronic equipment located nearby. The problem becomes more acute when the shielding is to be temporary, for example, when the radio equipment in a missile is being checked out in preparation for flight. In this particular situation generated radio waves may interfere with the checkout procedure for other critical equipment. Up to now, portable rigid metallic panels were constructed around the equipment to shield the equipment from unwanted radio waves and to prevent degradation of the equipment by these stray radio waves.

Briefly, this invention provides a portable inflatable structure, which is readily erected in the field by inflating the structure with air, and which is provided with an air impervious fabric having a thin flexible metallic film coated on its surface. The purpose of the metallic film is to reflect some of the radio signals and to create a penetration loss to the radio signals that may penetrate or pass through the fabric. To further attenuate the radio waves both surfaces of the fabric could be coated with thin flexible metallic film, and more than one metallic coated fabric could be placed parallel to and spaced from the first. In addition, a woven mesh of flexible fine metallic wire is placed on the surface of the fabric or woven into the fabric and in electrical contact with metallic film coated thereon. In electrical contact with the woven mesh is placed a grid network of flexible, braided cable made of many fine flexible wires which are suitably grounded to provide a low resistance path to ground.

An object of this invention is to provide a portable inflatable structure for shielding radio waves.

Another object of this invention is to provide an inflatable enclosure which is capable of enclosing an environment substantially free of radio signals either man made or natural.

Another object of this invention is to provide a low cost portable structure that substantially prevents radio waves from passing therethrough.

These and other objects, features and advantages will be apparent from the following description and the accompanying drawing wherein.

Figure 1:
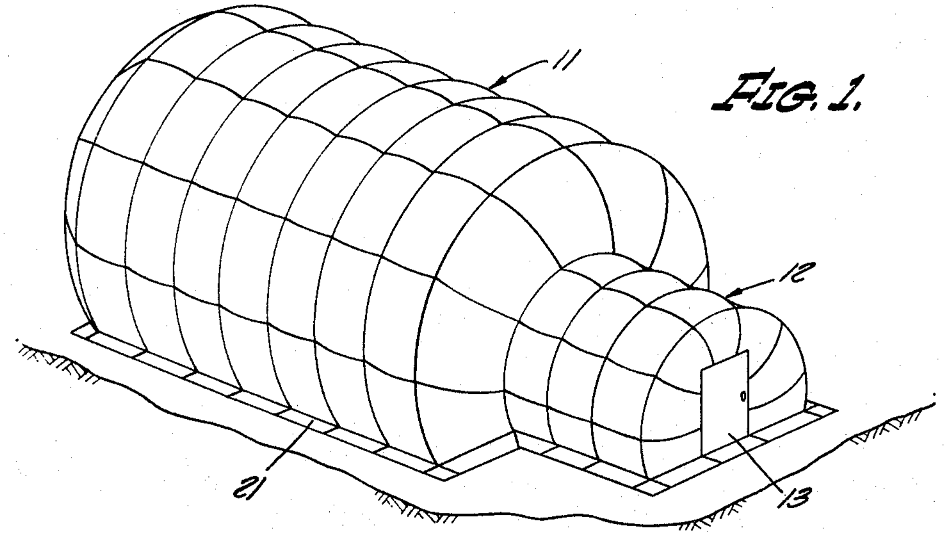
FIG. 1 is a pictorial view of a tent structure embodying the present invention.
Figure 2:
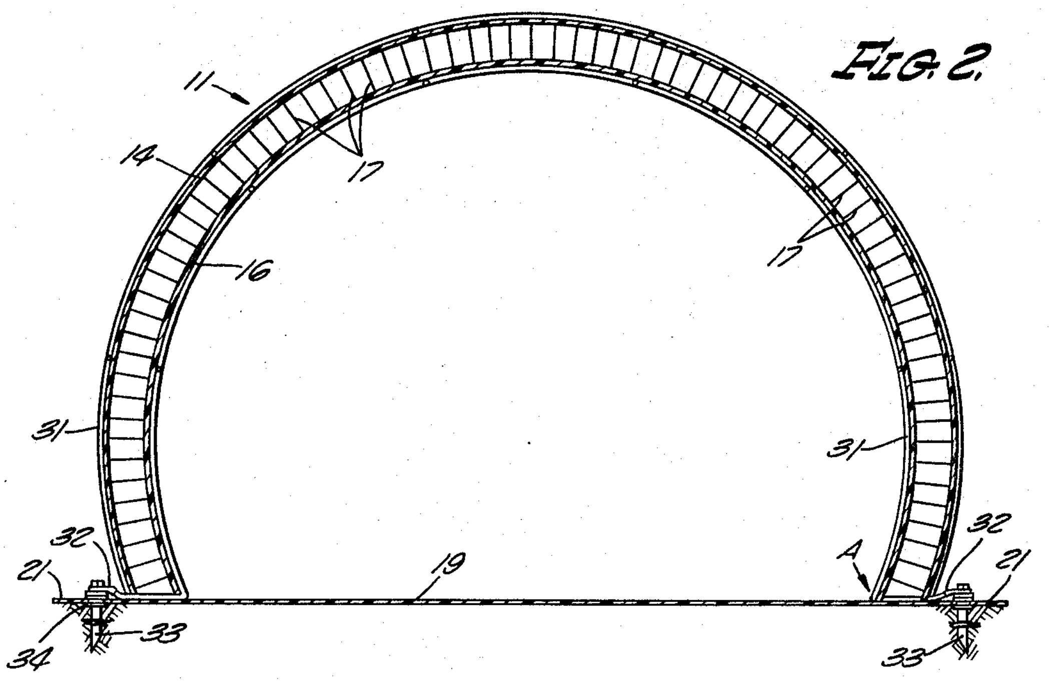
FIG. 2 is an elevation of the tent structure in section.

Referring to the drawing and to FIGS. 1 and 2, in particular, there is shown an inflatable tent structure having preferably an arcuated main chamber 11 and an entrance chamber 12. The entrance chamber 12 has a suitable door 13 for access in and out of the main chamber 11. The chamber 11 is made of a flexible fabric shown in cross-section in FIG. 2. The fabric includes an outer cover 14 and an inner liner 16 which are both air impervious. The cover 14 and liner 16 are tied together by the threads 17 whose ends are suitably fixed to the adjacent surfaces of the cover 14 and liner 16. The edges of the cover 14 and liner 16 are suitably fixed and sealed to an air impervious base member 19 as shown at point A in FIG. 2 so that an air tight chamber is formed between the cover 14 and liner 16. The base member 19 has preferably a margin 21 extending beyond the chamber 11 for reasons that will be explained hereinafter. Since the cover 14, liner 16 and member 19 are air impervious, they are made from impervious materials, for example, rubber, vinyl coated cloth or a polyester plastic sheet, and the threads 17 are made of a flexible material relatively strong in tension, for example, cotton thread, or thread-like polyester plastic. Thus, the space between the cover 14 and liner 16 can be inflated with air through a suitable valve (not shown) provided for this purpose. The fabric for the entrance chamber 12 is similarly constructed with the cover 14 and liner 16 being continuous over the main and entrance chamber.

Figure 3:
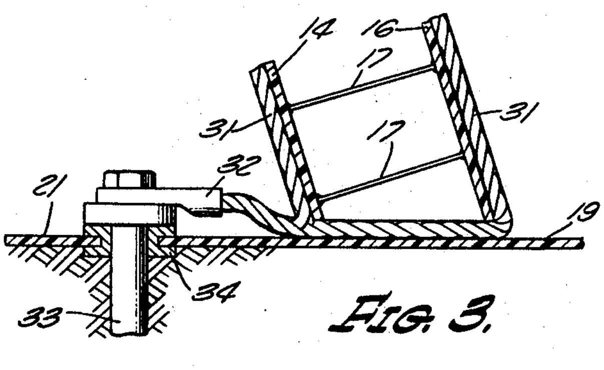
FIG. 3 is an enlarged sectional view of one edge of the structure showing a typical path to ground.
Figure 4:
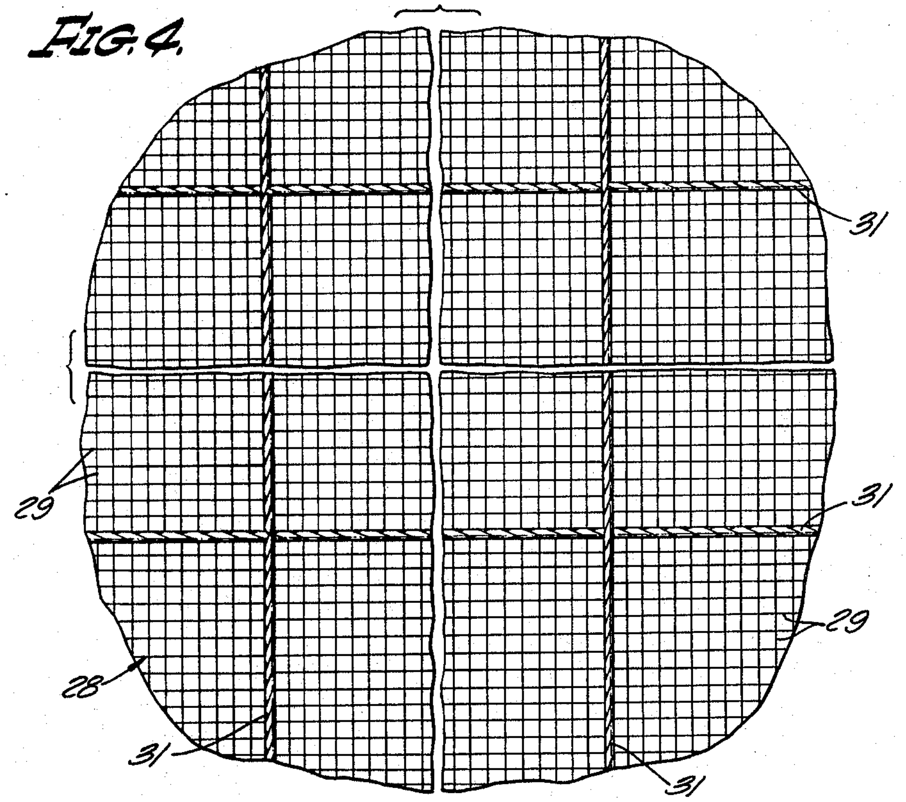
FIG. 4 is an enlarged plan or surface view of a fraction of the fabric comprising the structure.
Figure 5:
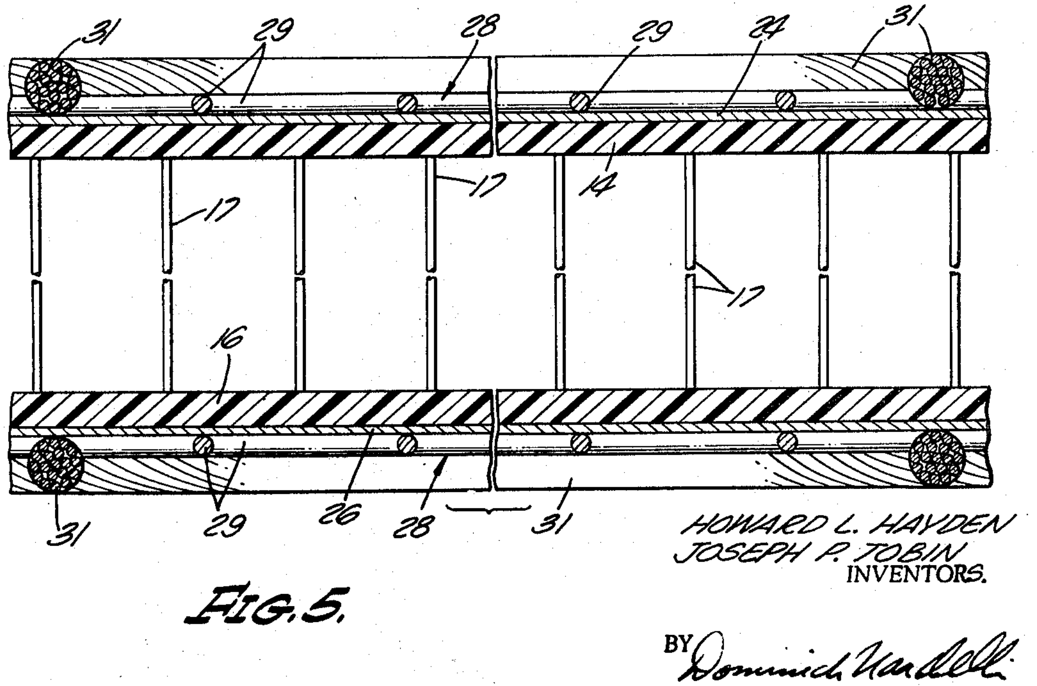
FIG. 5 is an enlarged sectional view of the fabric comprising the tent structure.

Referring to FIG. 5 the outer surface of the cover 14 has a thin film or coating 24 (FIG. 3) of metal, for example, aluminum about 1000 angstroms thick. The thickness of the film 24 is chosen so that maximum flexibility is obtained in the fabric with maximum conductivity. Also one surface of the liner 16 has a thin film or coating 26 which is similar to coating 24. Thus the thin metallic films 24 and 26 attenuate the radio waves that tend to radiate therethrough. If the radio waves are relatively strong, the films 24 and 26 may not have sufficient thickness and conductivity to attentuate the wave and still provide flexibility in the fabric. To increase the conductivity, a mesh 28, made of, for example, crossing very thin wires 29 is bonded to the films. A plan view of the mesh 28 is shown in FIG. 4 while the enlarged section in FIG. 5 shows that wires 29 are preferably single filaments. Over the mesh 28 are placed strands 31 which cross each other to form a grid network. The strands 31 are preferably made from plurality of thin wires into a flexible braided wire which bends with the fabric, whenever the tent structure is deflated and folded for storage and shipment. The strands 31 on the cover 14 and the strands 31 on the liner 16 extend to the base member 19, while the strands 31 on the liner 16 pass through the space formed by the cover and liner to connect with the strands 31 on the cover 14, as shown in FIG. 3. A suitable cable connector 32 is provided on the ends of the strands 31. The tent structure is suitably grounded by inserting into the ground metallic spikes 33 through eyelet 34 provided in the margin 21 of the base member. The cable connectors 32 are suitably bolted to respective spikes 33. In addition the surface of the base member 19 also has a thin film coating of aluminum (not shown). The door 13 is a panel which could be made of a similar fabric as in the chambers 11 and 12, or the door 13 could be made from a rigid metallic panel. Suitable power inlets would be provided into the tent structure.

When the tent structure is inflated an enclosure is formed that is shielded from external radio waves and contains radio waves generated inside the tent structure. When the tent structure is deflated and if rigid door panels are used, the rigid door panels are removed and the remaining structure is readily folded for easy storage and transportation.

With the present disclosure in view, modifications of the invention will appear to those skilled in the art. Accordingly, the invention is not limited to the exact details of the illustrated preferred embodiment, but includes all such modifications and variations coming within the scope of the invention as defined in the claims.

What is claimed is:

1. An air-inflated, portable tent structure comprising: an air impermeable flexible sheet, and
a thin metallic film deposited on at least one surface of said sheet,
said film having a thickness such that said sheet is flexible and sufficient electrical conductivity is provided on the deposited surface, and means for grounding said metallic film.

2. The structure of claim 1 wherein:
another air impermeable flexible sheet is disposed parallel to the other sheet,
flexible means are provided between the two sheets to hold the two sheets in spaced apart relationship, and
a thin metallic film is deposited on at least one surface of said other sheet,
said film on said other sheet having a thickness such that said other sheet is flexible and sufficient electrical conductivity is provided on the deposited surface of said other sheet and means for grounding said metallic film on said other sheet.

3. The structure of claim 1 wherein:
a mesh of fine wires is connected and bonded to said film to provide low electrical resistance paths to ground on the deposited surface.

4. The structure of claim 3 wherein:
a grid network of flexible braided wires is connected to said mesh of fine wires to further provide low electrical resistances paths to ground.

5. The structure of claim 2 wherein:
a base member is provided and the two sheets are attached thereto to provide an air tight chamber between the two sheets and the base member which chamber can be filled with air.

6. The structure of claim 2 wherein:
a mesh of fine wires is connected and bonded on at least one of said films to provide low electrical resistance paths to ground on the deposited surface.

7. The structure of claim 6 wherein:
a grid network of flexible braided wires is connected to said mesh of fine wires to further provide low electrical resistance paths to ground.

8. The structure of claim 7 wherein:
a base member is provided and the two sheets are attached thereto to provide an air tight chamber between the two sheets and the base member which chamber can be filled with air,
said base member is provided with a margin extending outwardly from said sheets,
eyelets spaced around said margin,
a metallic spike disposed through each of said eyelets, and
electrically connected means for electrically connecting said braided wires to said spikes so that said grid network would be grounded when said tent structure is erected.

9. The structure of claim 1 wherein:
the thickness of said film is less than 2000 angstroms.

10. The structure of claim 8 wherein:
the thickness of said film is less than 2000 angstroms.

11. The structure of claim 10 wherein the thickness of the wires in said mesh is less than .005 inch.

12. An air-inflated, portable tent structure comprising:
a flexible sheet,
a thin metallic film deposited on at least one surface of said sheet, and
a mesh of wires electrically connected together and to said film to provide low electrical resistance paths on the deposited surface.

13. The structure of claim 12 wherein:
a grid network of flexible braided wires is connected to said mesh of fine wires to further provide low electrical resistance paths.

References Cited

UNITED STATES PATENTS

| | | | |
|---|---|---|---|
| 2,698,020 | 12/1954 | Phane | 52—2 |
| 3,047,860 | 7/1962 | Swallow et al. | 52—2 |
| 3,184,742 | 5/1965 | Cutler | 52—2 |
| 3,282,533 | 11/1966 | Spain | 52—2 |
| 2,895,490 | 7/1959 | Dimond | 52—2 |

FOREIGN PATENTS

| | | |
|---|---|---|
| 1,235,093 | 5/1960 | France. |

REINALDO P. MACHADO, *Primary Examiner.*